INVENTORS
LUIGI VACCA
ROBERT ZINCONE

BY *Vernon F. Hauschill*
ATTORNEY

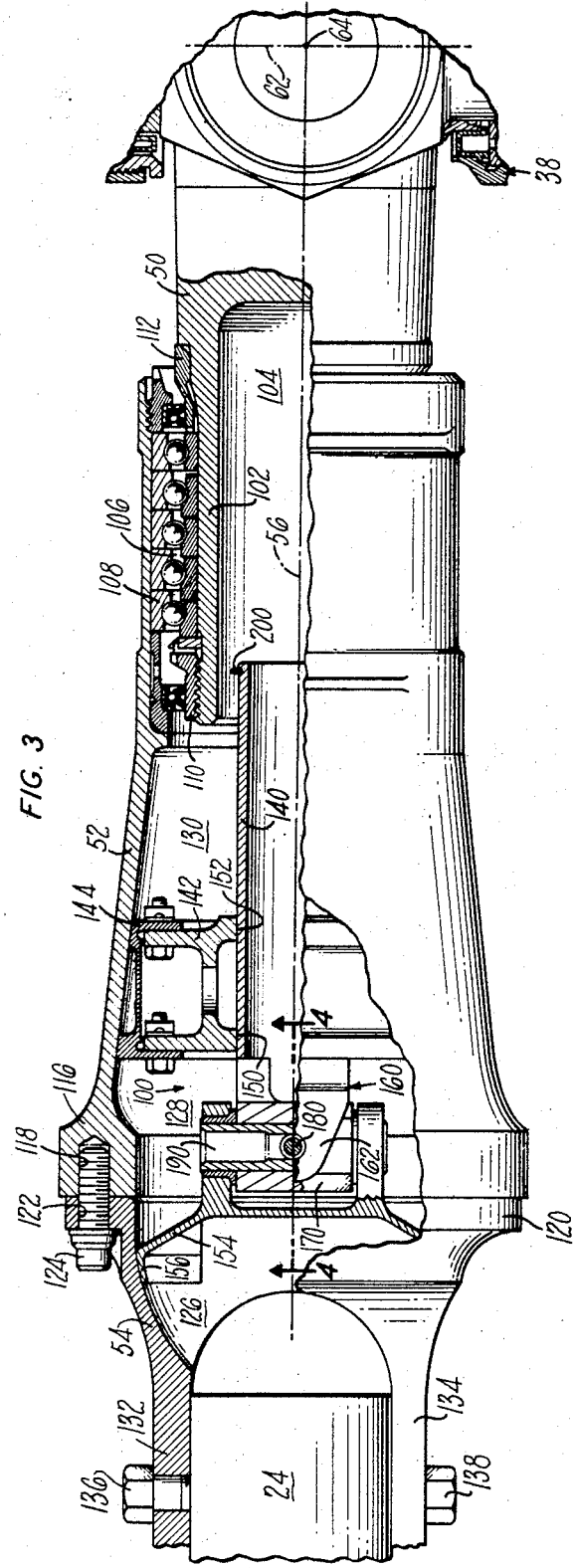

United States Patent Office 3,428,132
Patented Feb. 18, 1969

3,428,132
HELICOPTER ROTOR WITH FOLDABLE BLADE
Luigi Vacca, Milford, and Robert Zincone, Stamford, Conn., assignors to United Aircraft Corporation, East Hartford, Conn., a corporation of Delaware
Filed Sept. 18, 1967, Ser. No. 668,592
U.S. Cl. 170—160.12
Int. Cl. B64c 27/50
22 Claims

ABSTRACT OF THE DISCLOSURE

Helicopter rotor with foldable blades wherein the fold mechanism is completely recessed within the blade and rotor hub and includes a telescoping foldable joint which permits the blade to be detached from, telescopically spaced from, and then folded with respect to the rotor hub assembly.

Background of the invention

This invention relates to a manually foldable helicopter blade and more particularly to such a blade in which the fold mechanism comprises a telescoping member enveloped within and connecting the blade to the rotor hub and including a universal joint so that the blade, after detachment from the hub assembly, can be radially displaced outwardly therefrom and then folded with respect thereto in any direction due to the action of the universal joint.

In accordance with the present invention, the telescoping foldable joint is completely enveloped within the blade and hub so as to present no aerodynamic drag, is independent of load-carrying parts so that it may be made of minimum weight since it carries no flight loads, and is preferably concentric about the blade pitch change axis so as to impose no loads upon the blade control system during folding. In accordance with the present invention, the universal joint which connects the blade to the hub permits complete freedom of direction in which the blade may be folded with respect to the hub and also permits freedom of the eventual positioning of the blade in its chord dimension for optimum stowage positioning.

In accordance with a further aspect of the present invention the universal joint includes a pip pin which is easily accessible and easily removable manually so as to permit detachment of the blade from the hub for blade removal and/or replacement.

In accordance with still a further aspect of the present invention, the blade is radially movable telescopically away from the hub or blade sleeve so as to permit a maximum degree of blade foldability with respect to the hub assembly.

In accordance with the present invention the telescoping universal joint which serves as the blade fold mechanism also servies as a blade piloting and positioning mechanism to facilitate reattachment of the blade to the hub during the blade unfolding operation.

This invention permits reworking existing blades which did not originally have blade folding capability so as to produce a foldable blade since the fold mechanism taught herein is independent of other functional blade parts and positioned internally within the blade. This mechanism can accordingly be incorporated into existing blades without reworking of the blade or rotor except to provide support for the telescoping, universal fold joint mechanism within the blade interior.

The invention permits the blade and rotor to perform all other conventional functions, such as blade pitch variation, blade flapping and autorotation without interference by the blade fold mechanism.

This invention permits blade folding with minimum weight addition, without addition of aerodynamic drag, and without affecting other helicopter rotor and blade functions.

Another feature of this invention is that the internal blade fold mechanism which is concentric about the blade pitch change axis introduces a negligible polar mass moment of inertia and thereby does not increase system forces.

When helicopters have to be stowed either in hangars or in storage wells of aircraft carriers and other installations, the rotor blades which project a substantial distance outboard of the helicopter fuselage occupy substantial space and a space saving can be accomplished if the rotor blades are either removable or foldable with respect to the rotor head and fuselage.

Rotor blade removal requires substantial blade carrying and aligning equipment both for removing and replacing the blades and presents the hazards of having the blades inadvertently interchanged during reinstallation to thereby adversely affect helicopter rotor tracking.

There are existing blade folding mechanisms in the prior art such as those disclosed in U.S. Patents Nos. 3,097,701, 2,925,130 and 3,101,785, but each of these mechanisms is either located externally of the helicopter rotor to create aerodynamic drag problems, or forms part of the helicopter load carrying structure so that it need be strengthened above and beyond that which would be necessary if it performed the blade folding function only. In addition, these prior art blade fold mechanisms impose loads upon the helicopter controls during folding and at other times.

Brief description of the drawing

FIG. 3 is a cross-sectional showing through the blade cuff-rotor sleeve connection of a helicopter to illustrate a preferred embodiment of the invention.

FIG. 4 is a cross-sectional showing along line 4—4 of FIG. 3.

FIG. 5 is a schematic showing of the pitch fold mechanism and its relation to the helicopter rotor and blade control system to illustrate its load independence therefrom.

Description of the preferred embodiment

Figure 1:
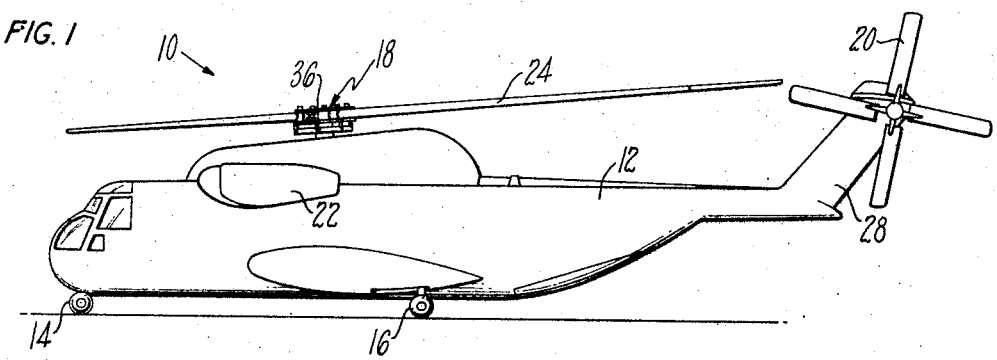
FIG. 1 is a showing of a modern helicopter incorporating the invention.

Referring to FIG. 1 we see modern helicopter 10 which includes fuselage 12, which is supported from the ground by landing gear such as 14 and 16, lift rotor assembly 18 and anti-torque tail rotor 20. One or more piston, turbojet or free turbine engines, such as 22, drive lift rotor assembly 18 through appropriate transmission 30. Rotor assembly 18 includes a plurality of blades or movable wings 24 connected to a rotor hub 36 so as to produce the necessary lift to propel helicopter 10 in flight. In conventional fashion, anti-torque rotor 20 is provided at tail or empennage 28 to counteract the torque load imposed upon fuselage 12 by lift rotor 18.

Figure 2:
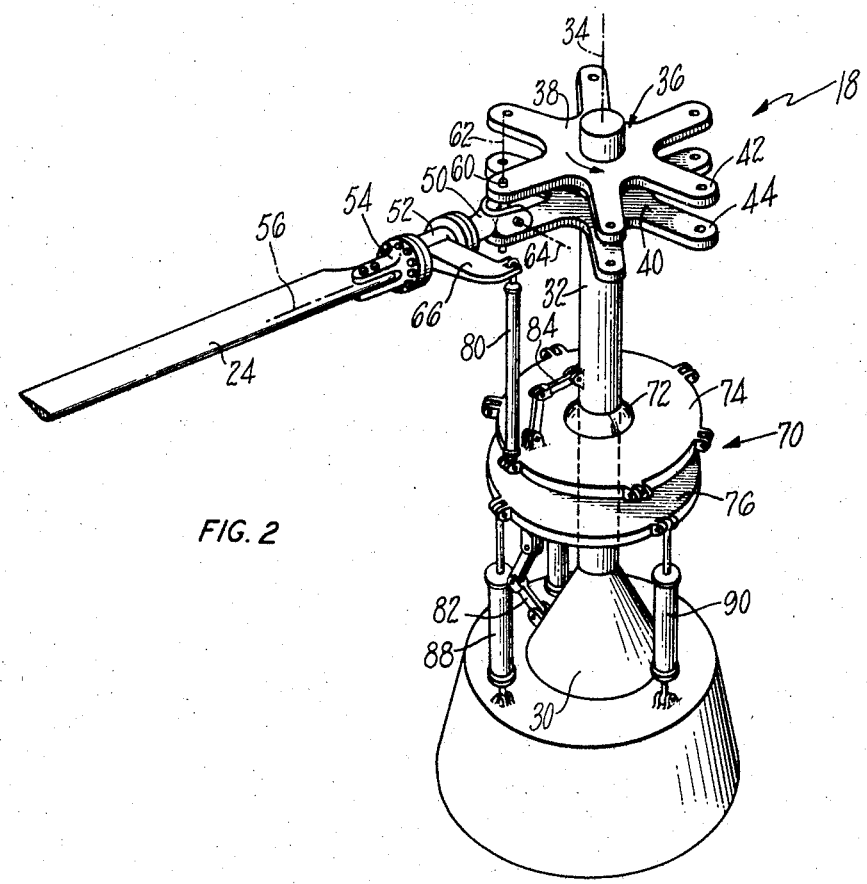
FIG. 2 is an isometric schematic showing of a helicopter rotor, with one blade illustrated, to show the helicopter rotor drive and control mechanism.

Referring to FIG. 2 we see the lift rotor assembly 18 in greater particularity as it is supported from helicopter fuselage 12. An appropriate transmission 30, such as the type shown in U.S. Patent No. 2,979,968, is driven by engine 22 and, in turn, drives rotor main or drive shaft 32 about axis of rotation 34. Rotor hub assembly 36 is mounted on drive shaft 32 for rotation therewith about axis 34. Hub assembly 36 includes top plate member 38 and bottom plate member 40, both of which include a plurality of radially extending arm members such as 42 and 44 projecting therefrom. While FIG. 2 shows but a single helicopter blade 24 projecting radially from rotor hub assembly 36, it should be borne in mind that there is actually a blade projecting from between each corresponding arm member 42 and 44 of top and bottom plates 38 and 40 so that, in fact, in the FIG. 2 construction there would be six blades.

Each blade 24 is connected to hub assembly 36 by spindle 50, sleeve 52 and cuff 54. In a fashion to be described hereinafter, spindle 50, sleeve 52, cuff 54 and blade 24 are mounted about pitch change or blade feathering axis 56 to permit variation of the pitch of blade 24. Spindle 50 is connected by cruciform member 60 to upper and lower plates 32 and 40 so that blade 24 is pivotable about lead-lag axis 62 and flapping axis 64. Sleeve 52 has pitch change horn 66 connected thereto so that as pitch change horn 66 is caused to move, sleeve 52, cuff 54 and blade 24 are caused to rotate about blade feathering axis 56 to vary the pitch of blade 24.

Still referring to FIG. 2 we see that swash plate assembly 70 is mounted on drive shaft 32 about spherical bearing 72. Swash plate assembly 70 includes rotating member 74 and stationary member 76. A plurality of pitch change links such as 80 project from and are pivotally connected to the pitch horn 66 and movable swash plate portion 74 so that swash plate movement causes blade pitch variation. Stationary scissors 82 connect the stationary portion 76 of swash plate assembly 70 to the transmission 30 to prevent rotation thereof, while movable scissors 84 connect the movable portion 74 of swash plate assembly 70 to the main rotor shaft 32 so as to cause portion 74 to rotate with rotor hub assembly 36. Three servo-actuators, two of which are shown at 88 and 90, are pivotally connected to transmission 30 and hence fuselage 12 and to swash plate stationary portion 76 and are actuatable by a conventional helicopter control system such as the one shown in U.S. Patent No. 3,199,601, so that swash plate 70 moves uniformly along drive shaft 32 so as to collectively vary the pitch of all helicopter blades 24 or so that swash plate 72 tilts with respect to drive shaft 32 so that the pitch of the helicopter blades 24 vary cyclically.

The description given above with respect to FIG. 2 is deemed sufficient to illustrate and describe the construction, operation and control of helicopter lift rotor 18 so as to permit a complete appreciation of the invention taught herein and reference is hereby made to U.S. Patent No. 2,669,313 which shows this construction or portions thereof in greater particularity.

Referring to FIG. 3, we see the blade fold mechanism 100 in its environment in greater particularity. Spindle 50, sleeve 52 and blade cuff 54 are positioned along and substantially concentrically about pitch change or feathering axis 56 of blade 24. As previously described, spindle 50, and hence the remainder of the elements outboard thereof are mounted with respect to outer plate 42 and inner plate 44 of rotor hub assembly 36 so as to be pivotable with respect thereto about flapping axis 64 and lead-lag axis 62. Spindle 50 is of substantially circular cross section at its radial outer end 102 and is hollow to define cavity 104 therewithin. Sleeve 52 is of substantially circular cross section and laps radially over cylindrical portion 102 of spindle 50 to define annular chamber 106 therewithin. Stack bearings 108 are positioned in annular chamber 106 between retaining means 110 and 112 to support sleeve 52, cuff 54 and blade 24 for pitch change rotation with respect to spindle 50 and hub assembly 36 about feathering axis 56.

Sleeve 52 has a circumferential flange 116 at its radial outboard end, which flange includes a plurality of circumferentially spaced apertures 118. Blade cuff 54 also includes a circumferential flange 120 about its radial inboard end and this flange includes a plurality of circumferentially spaced apertures 122 which align with corresponding apertures 118 in sleeve flange 116 so that bolt members 124 may be passed into or therethrough to connect cuff 54 and hence blade 24 to sleeve 52 and hence spindle 50 and the rotor hub assembly 36. Cuff 54 is hollow at its radial inner end to define cavity 126 therewithin which meets with and opens into cavity 128 of sleeve 52 to define overall chamber 130 enveloped within cuff 54, sleeve 52 and spindle 50. In a manner to be described hereinafter, blade fold mechanism 100 is positioned within enclosed chamber 130 so that it presents no aerodynamic drag on rotor assembly 36. Cuff 54 bifurcates at its outer end to include an upper plate 132 and a lower plate 134, each of which is attached to blade 24 by appropriate means such as bolts 136 and 138.

Still referring to FIG. 3, it will be seen that blade fold mechanism 100 comprises telescoping cylindrical sleeve 140 which is supported by support ring 142, which is in turn supported by attachment 144 from sleeve 52 to present two equal diameter cylindrical support surfaces 150 and 152 positioned circumferentially about feathering axis 56. Support ring 142 thereby positions telescoping sleeve 140 concentrically about feathering axis 56 both for translation therealong and rotation thereabout. Blade fold mechanism 100 also includes attachment flange 154 which is bonded or in another conventional manner attached at flange 156 to the interior of blade cuff 54. Attachment member 154 and telescoping sleeve 140 are connected through universal joint 160.

Referring to FIGS. 3 and 4, universal joint 160 can be seen in greater particularity. Universal joint 160 is formed from spaced flange member 162 which projects radially outwardly from telescoping sleeve 140 and which includes aligned apertures 164 and 166 therein. Attachment means 154 includes cylindrical projection 170 extending radially inwardly therefrom, which includes aligned apertures 176 and 178 therewithin which align with apertures 164 and 166 of telescoping member 140 to receive pip pin 180 therethrough. Pip pin 180 has a finger ring 182 to permit ready withdrawal thereof to allow for easy removal and/or replacement of cuff 54 and blade 24. Chain connector 186 extends between attachment means 154 and pip pin 180 to prevent loss thereof. Pivot pin or pins such as 190 extend through universal joint 160 at right angles to pip pin 180 and pivotally connect to both connector 154 and member 162 so as to permit universal action of blade 24 and cuff 54 with respect to sleeve 52. It will be noted that sleeve 140 is unrestrained from rotation about axis 56 except by universal joint 160 and is therefore free otherwise to rotate within support 142 and sleeve 52. This freedom of sleeve 140 permits unlimited freedom to change blade pitch for stowing purposes in a manner completely independent of the flight control system. Flange member or snap ring 200 projects circumferentially from the radially inward end of sleeve 140 and abuts support 142 to limit the telescopic movement of sleeve 140 within sleeve 52, when readily detachable bolts 124 are removed to free blade 24 and cuff 54 from sleeve 52 to thereby permit the radial telescopic movement of the cuff 54 away from the sleeve 52.

It will accordingly be seen that in the embodiment of the invention shown in FIG. 3, once bolts 124 have been removed, blade 24 and cuff 54 may be pulled radially outward from sleeve 52 due to the telescoping action of foldable telescopic joint or connecting member 100 until stop ring 200 abuts support 142. The members of the blade and rotor continue to be attached to one another at all times throughout this blade and cuff extension operation. With the blade and cuff so extended they may then be folded to any desired angular position about universal joint 160 with respect to sleeve 52.

It will be obvious that universal joint 160 could have been fabricated to extend into the hollow interior 126 of cuff 154 so that with cuff 154 detached from sleeve 52, a limited amount of blade folding could be accomplished with such a construction, however, due to the telescoping capability of blade folding mechanism 100 and its universal joint, blade 24 and cuff 54 may be folded a substantially greater number of degrees with respect to sleeve 52 and to any angular and blade chord position with respect to sleeve 52.

It will be noted from the above description that the blade fold mechanism 100 is enveloped within blade-hub chamber 130 so as to add no aerodynamic drag to the rotor, so that it is independent of all load-carrying members of the blade and therefore need not be made of sufficiently rugged and heavy construction to permit it to perform a load carrying function, and so that existing blades without blade fold provisions could have the fold mechanism 100 of FIGS. 3 and 4 incorporated thereinto without reoperation of the blade and rotor load carrying parts. Further, it will be noted that blade fold mechanism 100 also serves the very useful function of piloting and positioning blade 24 and cuff 54 with respect to sleeve 52 when the blade is being returned to its operating position from its folded position during which time telescoping sleeve 140 guides cuff 54 along the flapping axis 56 and universal joint 160 permits rotation of the cuff to accomplish the alignment of flange apertures 122 and 118 to receive releasable bolts 124.

Had the blades been completely removed from the rotor for stowing rather than being folded with respect thereto, not only would we not have the blade piloting aid just described but also, there would be no assurance that a blade and cuff could not be inadvertently connected to the wrong sleeve thereby adversely affecting rotor tracking.

As previously stated, it is desirable to have the blade fold mechanism 100 concentrically positioned about feathering axis 56 so that the helicopter control system is not loaded during the blade folding operation. This is best illustrated schematically by viewing FIG. 5 which shows blade fold mechanism 100 concentrically positioned within sleeve 52 about feathering axis 56 and pitch change horn 66 projecting therefrom and connected to swash plate 70 by pitch change link 80. With blade fold mechanism 100 so concentrically positioned, when cuff 54 is removed from sleeve 52 no load is imposed upon the conrol system 66–80–70. Had the folding mechanism been positioned a distance away from the feathering axis 50 such as at 100′, when the cuff 54 is removed from the sleeve 52 for folding, the blade fold mechanism loads the control mechanism 66–80–70 because it presents a torque constituting the product of its weight "W" times its distance "D" from the feathering axis 56 which must be absorbed by the controls.

Figure 6:
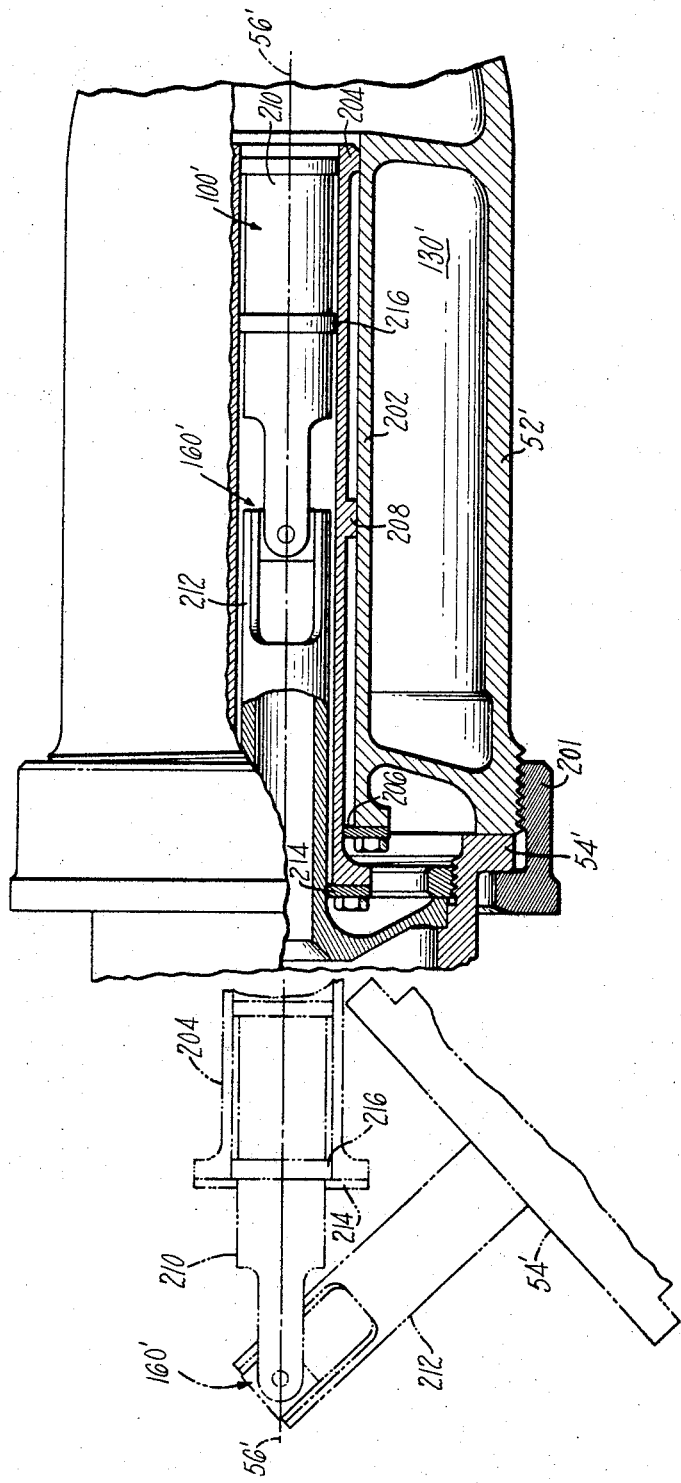
FIG. 6 is a cross-sectional showing of a blade-to-rotor connection illustrating another embodiment of this invention including nested telescoping elements.

In installations where it is desirable to have the blade and cuff extend a substantial distance from the sleeve before folding, either because of limited space within chamber 130 or because a maximum arcuate folding motion of the blade and cuff is desired, a construction of the type shown in FIG. 6 might be desirable. As shown in FIG. 6, sleeve 52′ is connected to cuff 54′ by a nut 201 which is shown to threadably engage sleeve 52′ and abut the flange of cuff 54′; however, the opposite relationship could as well exist. In the FIG. 6 construction sleeve 52′ and cuff 54′ cooperate to define internal chamber 130′ therewithin and blade fold mechanism 100′ is again concentrically positioned about feathering axis 56′ for translation therealong. Blade fold mechanism 100′ includes sleeve member 202 which is mounted in stationary fashion within sleeve 52′ and which receives slidable sleeve 204 therewithin. Fixed sleeve 202 includes top ring 206, which is eventually abutted by land 208 on translatable, rotatable telescoping sleeve 204 to limit the telescoping motion of sleeve 204 with respect to sleeve 202. Cylindrical members 210 and 212 are translatably positioned within sleeve 204 concentically about axis 56′ and are joined by universal joint 160′. Stop ring 214 projects from ring 204 and eventually engages land 216 on member 210 to limit the amount that telescoping members 212 and 210 can be telescoped relative to sleeve 204.

By viewing FIG. 6 it will accordingly be seen that with releasable nut 201 removed, blade cuff 54′ can be pulled radially outward from sleeve 52′ from its FIG. 6 solid line position to its FIG. 6 phantom line position and pivoted about universal joint 160′ as shown in phantom. In the FIG. 6 phantom position sleeve 204 has moved radially outward until land 208 abuts stop ring 206 and members 212 and 210 have moved with sleeve 204 to this position and therebeyond until land 216 abuts stop ring 214. Sleeve 212 moves with sleeve 210 along feathering axis 56 until the fully extended position is arrived at, whereupon cuff 54 is folded about universal joint 160′ in blade folding action about sleeve 52.

Figure 7:
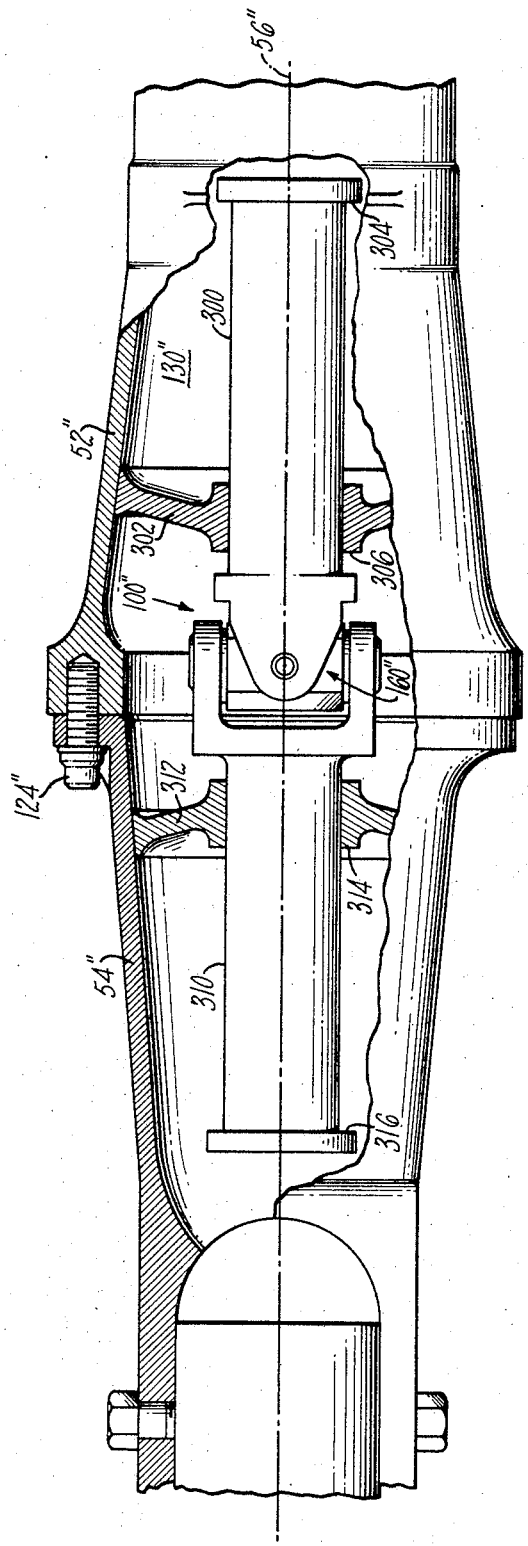
FIG. 7 is a cross-sectional showing of a blade-to-rotor connection illustrating still another embodiment of this invention including telescopic elements in both the cuff and sleeve to permit maximum separation therebetween.

FIG. 7 illustrates another embodiment of the foldable, telescopic blade fold mechanism.

Referring to FIG. 7 we see an embodiment of this telescoping, foldable blade folding joint 100″ which is telescoping both with respect to sleeve 52″ and cuff 54″. Telescoping sleeve 300 is positioned within enclosed chamber 130″ defined within cuff 54″ and sleeve 52″ and supported by fixed support mechanism 302 to be concentric about and both rotatable and translatable along feathering axis 56″ in telescoping fashion. Stop ring 304 projects from the radial inward end of sleeve 300 and abuts cylindrical support member 306 of support 302 to limit the distance which sleeve 304 can be pulled telescopically out of sleeve 52. Sleeve member 310 is supported within cavity 130″ by cylindrical support member 312 which projects inwardly from cuff 54″. Sleeve member 310 includes stop ring 316 which abuts cylindrical support member 314 of support 312 to limit the radial telescopic translation permitted between sleeve 310 and cuff 54. Telescoping sleeves 300 and 310 are joined by universal joint 160″ so that, after releasable bolt members 124″ are removed, cuff 54″ and hence the blade 24 can be moved radially outward from sleeve 52″ and hence hub 36 for a selected distance until stop rings 304 and 316 engage cylindrical support members 302 and 312, respectively, whereupon cuff 54″ and hence blade 24 may be folded about universal joint 160″ with respect to sleeve 52″ and hence rotor assembly 18.

We claim:
1. A helicopter rotor including:
    (1) a rotor hub mountable for rotation about an axis of rotation and including a plurality of hollow sleeve members extending radially therefrom,
    (2) a plurality of helicopter blades extending radially from said hub and each including a hollow cuff section abutting one of said sleeve members to define a chamber therewithin,
    (3) releasable means connecting each of said blade cuffs to one of said sleeve members so that said blade extends substantially radially from said rotor hub for rotation therewith about said axis of rotation,
    (4) a foldable, telescopic joint member positioned within said chamber and connected to the interior of said sleeve member and said cuff so that, with said releasable connecting means released, said blade may be moved radially outwardly with respect to said hub sleeve member while still joined thereto by telescopic action of said telescopic joint and further, so that said blade may be folded with respect to said sleeve member about said joint.
2. Apparatus according to claim 1 wherein said foldable, telescopic joint member includes a universal joint for blade folding.
3. Apparatus according to claim 2 wherein said universal joint includes a pip pin which is easily retractable manually to permit blade release and replacement.

4. Apparatus according to claim 1 wherein said helicopter blades are supported by said rotor hub and sleeve members to permit blade pitch change variation about a blade pitch axis and further wherein said foldable, telescopic joint includes members which telescope along and are concentric with respect to said blade pitch change axis.

5. Apparatus according to claim 1 wherein each abutting blade cuff and sleeve member include abutting flanges having a plurality of aligned apertures positioned circumferentially thereabout and wherein said releasable means includes a plurality of bolt members extending into and received in each set of aligned apertures so as to releasably attach each blade cuff section to one of said sleeve members.

6. Apparatus according to claim 1 wherein said releasable means includes a nut member sleeved over and connected to each abutting blade cuff and sleeve member in a connecting fashion.

7. Apparatus according to claim 1 wherein said foldable, telescopic joint includes a telescoping sleeve mounted for telescopic motion within said sleeve member and includes a fixed member connected to the interior of said cuffs and further includes a universal joint connecting said telescoping sleeve member and said fixed member.

8. Apparatus according to claim 1 wherein said foldable telescopic joint includes a cylindrical member mounted for telescopic motion within said sleeve member, a cylindrical member mounted for telescoping motion within said cuff, and a universal joint connecting said telescoping cylindrical members.

9. Apparatus according to claim 1 wherein said foldable, telescopic joint includes a first sleeve mounted for telescopic motion within said sleeve member, and second and third sleeves mounted for telescopic motion within said first sleeve with said first sleeve connected to said sleeve member and said third sleeve connected to said cuff, and a universal joint connecting said second and third sleeves.

10. In a helicopter rotor having:
(1) a rotor hub assembly mountable for rotation about an axis of rotation and including:
   (a) blade support means projecting radially therefrom and having a hollow interior,
(2) a helicopter blade projecting radially from said hub assembly and having a hollow cuff at the inner end thereof,
(3) releasable means connecting said blade cuff to said blade support means so that said blade extends radially from said hub assembly and so that the hollow interiors of said cuff and said blade support means define an enclosed chamber,
(4) telescoping, foldable joint mechanism including:
   (a) link members connected at one end to said blade cuff and to said blade support means, respectively, and
   (b) a universal joint connecting said link members at their opposite ends so that as said releasable member is released, said blade may be moved radially outward from said rotor hub while still so joined through said telescopic joint mechanism and, further, so that said blade may be folded with respect to said hub assembly about said joint.

11. A helicopter rotor including:
(1) a rotor drive shaft mounted for rotation about an axis of rotation,
(2) a rotor hub assembly mounted on said rotor drive shaft for rotation therewith and including an upper plate member having a plurality of radially extending arm members, and a bottom plate member having a plurality of radially extending arm members aligned with said upper plate arm members,
(3) a blade spindle mounted between each of said aligned arm members of said top and bottom plate and including a cylindrical outer end,
(4) means connecting said spindle member to said aligned arm members of said top and bottom plates so that said spindle member is pivotable with respect thereto about a flapping axis and about a lead-lag axis,
(5) a blade sleeve of circular cross section and having a hollow interior sleeved at one end over said cylindrical portion of said spindle to define an annular chamber therebetween and so that said opposite end is hollow,
(6) a stack bearing positioned in said annular chamber between said spindle and said sleeve so that said spindle supports said sleeve for rotation about a blade pitch change axis,
(7) a pitch change horn extending laterally from and attached to the exterior of said sleeve so that motion of said pitch change horn causes rotation of said sleeve with respect to said spindle about said pitch change axis,
(8) a blade cuff having a hollow interior abutting said blade sleeve,
(9) releasable means attaching said blade cuff to said blade sleeve so that said abutting hollow interiors thereof define an enclosed chamber,
(10) a helicopter blade attached to and extending radially from said blade cuff so as to be pivotable with said sleeve and cuff about the blade pitch change axis,
(11) a telescoping, blade fold member positioned within said enclosed chamber within said sleeve and cuff and connected to the interior of said sleeve and said cuff to form a telescoping connection therebtween and including a universal joint in said telescopic member so that, after said releasable means releases said blade cuff from said sleeve, said blade and cuff may be moved radially with respect to said sleeve in telescoping fashion while still connected thereto through said telescoping member and then folded with respect to said blade sleeve to any desired position,
(12) a swashplate assembly mounted on said drive shaft so as to be rotatable therewith and tiltable with respect thereto,
(13) means to tilt said swashplate assembly with respect to said drive shaft,
(14) pitch change links connecting said swashplate to said pitch change horns so that said helicopter blade will pivot about said pitch change axis when said blade is rotating about said axis of rotation with said hub assembly both when said swashplate assembly is tilted with respect to said driveshaft and when said swashplate assembly is moved along axis of rotation with respect to said hub assembly.

12. Apparatus according to claim 11 wherein said foldable telescoping joint includes a first sleeve member positioned in the hollow interior of said blade sleeve concentrically about said blade pitch change axis and mounted for translation therealong with respect to said blade sleeve, a second member connected to the interior of said blade cuff, and a universal joint connecting said second member and said sleeve member.

13. Apparatus according to claim 12 wherein said second member is mounted within the hollow interior of said cuff member and said first sleeve member is mounted concentrically about said pitch change axis for telescopic motion therealong relative to said blade cuff.

14. Apparatus according to claim 13 wherein said universal joint includes a pip pin which is readily removable to permit disconnection of said blade and cuff from said sleeve, spindle and rotor assembly to facilitate blade removal and replacement.

15. A helicopter rotor including:
(1) a rotor hub mountable for rotation about an axis of rotation and including a plurality of hollow blade attachment members extending radially therefrom, (2) a plurality of helicopter blades extending radially from said hub and each including a hollow radially inboard end abutting one of said blade attachment members to define a chamber therewithin, (3) releasable means connecting each of said blade ends to one of said blade attachments so that said blade extends substantially radially from said rotor hub for rotation therewith about said axis of rotation, (4) a foldable, telescopic joint member positioned within said chamber and connected to the interior of said blade end and said blade attachment member so that, with said releasable connecting means released, said blade may be moved radially outwardly with respect to said blade attachment member while still joined thereto by telescopic action of said telescopic joint and further, so that said blade may be folded with respect to said hub blade attachment member about said joint.

16. Apparatus according to claim 15 wherein said foldable, telescopic joint includes a telescoping sleeve mounted for telescopic motion within said blade attachment member and includes a fixed member connected to the interior of said blade end and further includes a universal joint connecting said telescoping sleeve and said fixed member, and means to limit the telescopic motion between said telescoping sleeve and said blade attachment member.

17. A helicopter rotor including:
(1) a rotor hub mountable for rotation about an axis of rotation and including a plurality of hollow blade attachment members extending radially therefrom, (2) a plurality of helicopter blades having the feathering axis and extending radially from said hub and each including a hollow radially inboard end abutting one of said blade attachment members to define a chamber therewithin, (3) releasable means connecting each of said blade ends to one of said blade attachments so that said blade extends substantially radially from said rotor hub for rotation therewith about said axis of rotation, (4) a foldable, telescopic joint member positioned within said chamber and connected to the interior of said blade end and said blade attachment member so that, with said releasable connecting means released, said blade may be moved radially outwardly with respect to said hub blade attachment member while still joined thereto by telescopic action of said telescopic joint and further, so that said blade may be folded with respect to said hub blade attachment member about said joint.

18. Apparatus according to claim 17 wherein said foldable telescopic joint includes a telescoping sleeve mounted concentrically about said feathering axis for telescopic motion within said blade attachment member and includes a fixed member concentric about said feathering axis and connected to the interior of said blade end and further includes a universal joint concentric about said feathering axis and connecting said telescoping sleeve and said fixed member.

19. Apparatus according to claim 17 wherein said foldable telescopic joint includes a first cylindrical member mounted concentrically about said feathering axis for telescopic motion within said blade attachment member, a second cylindrical member mounted concentrically about said feathering axis for telescopic motion within said blade end, and a universal joint concentric about said feathering axis and connecting said telescoping cylindrical members.

20. Apparatus according to claim 17 wherein said foldable, telescopic joint includes a first sleeve mounted concentrically about said feathering axis for telescopic motion within said blade attachment member and second and third sleeves mounted concentrically about said feathering axis for telescopic motion within said first sleeve, with said first sleeve connected to said blade attachment member and said third sleeve connected to said blade end, and a universal joint concentric about said feathering axis and connecting said second and third sleeves.

21. Apparatus according to claim 19 and including means to limit the amount of telescopic motion between said first cylindrical member and said blade attachment member and means to limit the amount of telescopic motion between said second cylindrical member and said blade end.

22. Apparatus according to claim 20 and including means to limit the amount of telescopic motion between said first sleeve and said blade attachment member, and means to limit the amount of telescopic motion between said second and third sleeves and said first sleeve.

References Cited

UNITED STATES PATENTS

| | | | |
|---|---|---|---|
| 3,097,701 | 7/1963 | Buivid | 170—160.12 |
| 3,356,155 | 12/1967 | Ferris | 170—160.12 |
| 3,369,611 | 2/1968 | Vacca et al. | 170—160.12 |

EVERETTE A. POWELL, JR., *Primary Examiner.*